(12) United States Patent
Nakata et al.

(10) Patent No.: US 11,327,347 B2
(45) Date of Patent: May 10, 2022

(54) OPTICAL WAVEGUIDE ELEMENT

(71) Applicant: SUMITOMO OSAKA CEMENT CO., LTD., Tokyo (JP)

(72) Inventors: Yu Nakata, Tokyo (JP); Tetsuya Fujino, Tokyo (JP); Satoshi Oikawa, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 17/043,407

(22) PCT Filed: Jan. 24, 2019

(86) PCT No.: PCT/JP2019/002190
§ 371 (c)(1),
(2) Date: Sep. 29, 2020

(87) PCT Pub. No.: WO2019/187558
PCT Pub. Date: Oct. 3, 2019

(65) Prior Publication Data
US 2021/0096402 A1 Apr. 1, 2021

(30) Foreign Application Priority Data
Mar. 30, 2018 (JP) .............................. JP2018-067802

(51) Int. Cl.
*G02F 1/03* (2006.01)
*G02F 1/035* (2006.01)

(52) U.S. Cl.
CPC ............ *G02F 1/035* (2013.01); *G02F 1/0316* (2013.01)

(58) Field of Classification Search
CPC ................................ G02F 1/035; G02F 1/0316
See application file for complete search history.

(56) References Cited

U.S. PATENT DOCUMENTS

| 4,397,753 A | * | 8/1983 | Czaja | .................... | C09K 13/08 |
| | | | | | 252/79.3 |
| 4,444,619 A | * | 4/1984 | O'Hara | .................. | H05K 3/062 |
| | | | | | 174/256 |

(Continued)

FOREIGN PATENT DOCUMENTS

| CN | 106092080 A | 11/2016 |
| JP | H01-160202 A | 6/1989 |

(Continued)

OTHER PUBLICATIONS

Advanced Plating Technologies, Hard Gold Plating VS Soft Gold Plating—Which is Right for My Application? Oct. 4, 2017; https://advancedplatingtech.com/blog/hard-gold-plating-vs-soft-gold-plating/ (Year: 2017).*

(Continued)

*Primary Examiner* — Peter Radkowski
(74) *Attorney, Agent, or Firm* — IpHorgan Ltd.

(57) ABSTRACT

Provided is an optical waveguide element capable of connection such as wire bonding, suppressing usage of gold, and suppressing deterioration of a conductor loss. An optical waveguide element includes a substrate 1 having an electro-optic effect, an optical waveguide 2 formed on the substrate, and a control electrode (30, 31) provided on the substrate and controlling a light wave propagating through the optical waveguide. The control electrode is made of a material other than gold, and the gold is disposed on at least a wire bonding portion 4 of the control electrode.

6 Claims, 2 Drawing Sheets

(56) References Cited

U.S. PATENT DOCUMENTS

| | | | | |
|---|---|---|---|---|
| RE32,555 E | * | 12/1987 | Czaja | C09K 13/08 134/3 |
| 4,963,974 A | * | 10/1990 | Ushio | C23C 18/44 257/750 |
| 5,202,151 A | * | 4/1993 | Ushio | C23C 18/44 427/304 |
| 6,301,399 B1 | * | 10/2001 | Mahapatra | G02F 1/0316 385/1 |
| 6,867,134 B2 | * | 3/2005 | Chen | G02F 1/0316 438/686 |
| 7,419,536 B2 | * | 9/2008 | Aiba | C23C 18/54 106/1.23 |
| 8,658,441 B2 | * | 2/2014 | Bando | H01L 33/38 438/22 |
| 2001/0008569 A1 | * | 7/2001 | Rangary | G02F 1/0316 385/3 |
| 2002/0118902 A1 | | 8/2002 | Kambe | |
| 2004/0002205 A1 | * | 1/2004 | Chen | G02F 1/0316 438/597 |
| 2006/0230979 A1 | * | 10/2006 | Aiba | C23C 18/54 106/1.23 |
| 2008/0193074 A1 | | 8/2008 | Sugiyama | |
| 2010/0086252 A1 | * | 4/2010 | Kinpara | G02F 1/0356 385/2 |
| 2012/0295373 A1 | * | 11/2012 | Bando | H01L 33/38 438/26 |
| 2014/0270617 A1 | * | 9/2014 | Muller | G02F 1/0115 385/3 |
| 2016/0313503 A1 | * | 10/2016 | Takemura | G02F 1/0316 |
| 2017/0219851 A1 | | 8/2017 | Miyazaki | |
| 2018/0069957 A1 | * | 3/2018 | Mushikabe | H04M 1/72415 |

FOREIGN PATENT DOCUMENTS

| | | |
|---|---|---|
| JP | H05-183259 A | 7/1993 |
| JP | H09-213730 A | 8/1997 |
| JP | H10-041328 A | 2/1998 |
| JP | 3179408 B2 | 4/2001 |
| JP | 2002-504709 A | 2/2002 |
| JP | 2002-134859 A | 5/2002 |
| JP | 2015-197452 A | 11/2015 |
| JP | 6110581 B2 | 3/2017 |
| JP | 2017-069820 A | 4/2017 |
| WO | 99/42887 A1 | 8/1999 |
| WO | 2014157458 A1 | 10/2014 |

OTHER PUBLICATIONS

Chen et al., Fabrication of conductive copper patterns using reactive inkjet printing followed by two-step electroless plating, Applied Surface Science 396 (2017) 202-207 (Year: 2017).*

Glazer et al., Effect of Au on the Reliability of Fine Pitch Surface Mount Solder Joints, Surface Mount International Conference, San Jose, CA, Aug. 27-29, 1991. (Year: 1991).*

Qui et al., Ultra-thin silicon/electro-optic polymer hybrid waveguide modulators, Applied Physics Letters 107, 123302 (2015) (Year: 2015).*

Wang et al., Nanophotonic lithium niobate electro-optic modulators, vol. 26, No. 2 | Jan. 22, 2018 | Optics Express 1547 (Year: 2018).*

Ratautas et al., Laser-induced selective copper plating of polypropylene surface, Proc. SPIE 9735, Laser Applications in Microelectronic and Optoelectronic Manufacturing (LAMOM) XXI, 973507 (Mar. 14, 2016); doi: 10.1117/12.2212431 (Year: 2016).*

Japan Patent Office, Tokyo, Japan—PCT/JP2019/002190—Written Opinion of the International Searching Authority, dated Mar. 15, 2019.

Japan Patent Office, Tokyo, Japan—PCT/JP2019/002190—International Search Report, dated Mar. 15, 2019, and dated Mar. 26, 2019.

* cited by examiner

OPTICAL WAVEGUIDE ELEMENT

CROSS REFERENCE TO RELATED APPLICATIONS

This application is a national stage completion application of PCT Application No. PCT/JP2019/002190, filed Jan. 24, 2019, and claims priority from Japanese Application No. 2018-067802, filed Mar. 30, 2018. Each of these applications is incorporated by reference herein in its entirety.

TECHNICAL FIELD

The present invention relates to an optical waveguide element, and more particularly, an optical waveguide element including a substrate having an electro-optic effect, an optical waveguide formed on the substrate, and a control electrode provided on the substrate and controlling a light wave propagating through the optical waveguide.

BACKGROUND ART

Optical waveguide elements such as optical modulators are widely used in an optical communication field or an optical measurement field. The optical waveguide element includes a substrate having an electro-optic effect such as lithium niobate, an optical waveguide formed on the substrate, and a control electrode provided on the substrate and controlling a light wave propagating through the optical waveguide.

In the related art, gold (Au) has been widely used as a material for the control electrode from the viewpoints of chemical stability of a material and easiness of manufacturing such as wire bonding. On the other hand, from the viewpoint of light modulation operation, it is desirable that conductivity is higher and a conductor loss is smaller. As a material other than gold, for example, it has been proposed to use silver (Ag) as in Patent Literature No. 1 or copper (Cu) or copper alloy as in Patent Literature No. 2. Since these materials have higher conductivity than gold, good high-frequency characteristics can be obtained.

However, when using materials other than gold, corrosion due to oxidation should be considered. As described in Patent Literature No. 3, in a transmission circuit of a high-frequency signal, even in a case where an insulator covers a surface of a metal film, it is known that a skin effect is exhibited by using a portion where a signal current has a low resistance (non-oxidized portion), so that deterioration of high-frequency characteristics is suppressed.

However, generally, in a case where the electrical connection is performed from the peripheral components, which are made of gold, to a pad of a signal electrode or a ground electrode by wire bonding or the like, the connection becomes difficult and the easiness of manufacturing deteriorates when the electrode is oxidized. In Patent Literature No. 1, gold is formed as an anti-oxidation film on an entire surface of the electrode, since this film is formed even on an unnecessary part, it causes deterioration of high-frequency characteristics and cost increase.

In addition, in a case where the gold film is partially disposed on the signal electrode that constitutes the control electrode or the ground electrode that is disposed to face the signal electrode, the following problems occur. For example, on the surface of the signal electrode or the like, a portion where the gold film exists and a portion where the gold film does not exist and becomes an insulator due to oxidation are formed, and the electric resistance of the surface of the electrode becomes uneven. Moreover, the distribution of electric resistance in a depth direction from the electrode surface also differs depending on the location of the electrode. Disturbance of the electric resistance on the electrode surface or in the vicinity thereof further increases the propagation loss of the high-frequency signal.

CITATION LIST

Patent Literature

[Patent Literature No. 1] Japanese Patent No. 3179408
[Patent Literature No. 2] Japanese Patent Application No. 2017-069820 (filed on Mar. 31, 2017)
[Patent Literature No. 3] Japanese Patent No. 6110581

SUMMARY OF INVENTION

Technical Problem

An object of the present invention is to solve the above-described problem and to provide an optical waveguide element capable of connection such as wire bonding, suppressing usage of gold, and suppressing deterioration of a conductor loss.

Solution to Problem

In order to solve the above problem, the optical waveguide element of the present invention has the following technical features.

(1) In an optical waveguide element including a substrate having an electro-optic effect, an optical waveguide formed on the substrate, and a control electrode provided on the substrate and controlling a light wave propagating through the optical waveguide, the control electrode is made of a material other than gold, and the gold is disposed on at least a wire bonding portion of the control electrode.

(2) In the optical waveguide element according to (1), the control electrode includes a signal electrode and a ground electrode, and at least in an action portion where an electric field of the control electrode acts on the optical waveguide, the gold is not disposed on a surface of the signal electrode and a surface, on a side facing the signal electrode, of the ground electrode.

(3) In the optical waveguide element according to (1) or (2), a portion on which the gold is disposed is only the wire bonding portion.

(4) In the optical waveguide element according to any one of (1) to (3), the material other than gold has an electric resistivity of $2.44 \times 10^{-8}$ $\Omega$m or less.

(5) In the optical waveguide element according to any one of (1) to (4), the control electrode is a plating electrode and a height of the plating electrode is 10 µm or higher.

(6) In the optical waveguide element according to any one of (1) to (5), a ratio of a height of the gold portion to a height of the control electrode is less than 10%.

Advantageous Effects of Invention

The present invention provides an optical waveguide element including a substrate having an electro-optic effect, an optical waveguide formed on the substrate, and a control electrode provided on the substrate and controlling a light wave propagating through the optical waveguide. The control electrode is made of a material other than gold, and the gold is disposed on at least a wire bonding portion of the control electrode. Therefore, connection such as wire bonding is possible and the easiness of manufacturing is improved. In addition, the usage of gold can be suppressed and an increase in cost can be suppressed. Furthermore, since gold is not disposed on most parts of the surface of the control electrode, deterioration of a conductor loss can be suppressed.

DESCRIPTION OF EMBODIMENTS

Figure 1:
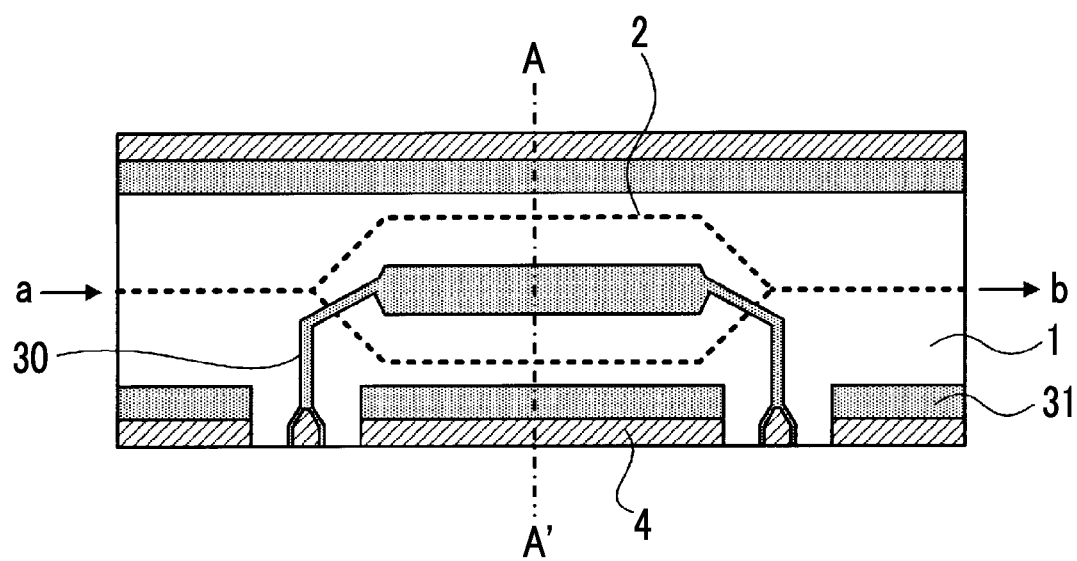
FIG. 1 is a plan view showing a first example of an optical waveguide element of the present invention.
Figure 2:
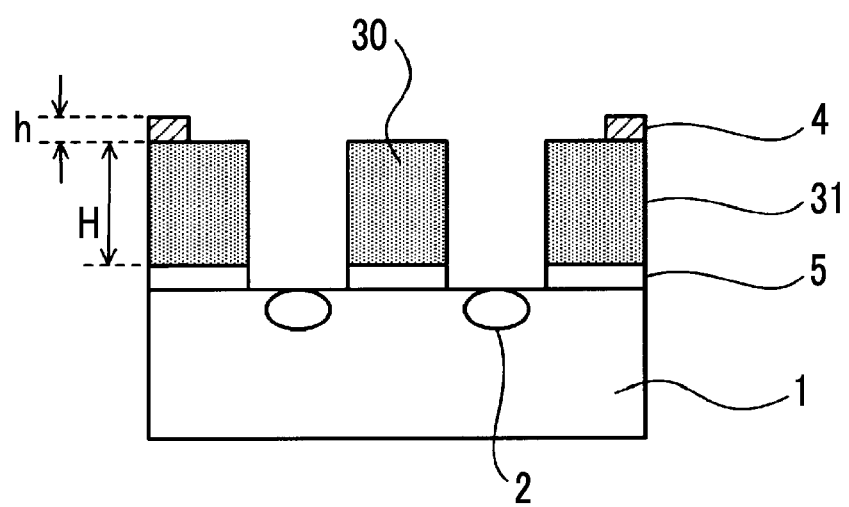
FIG. 2 is a cross-sectional view taken along one-dot chain line A-A' in FIG. 1.

Hereinafter, the optical waveguide element of the present invention will be described in detail with reference to suitable examples. As shown in FIGS. 1 and 2, the optical waveguide element of the present invention includes a substrate 1 having an electro-optic effect, an optical waveguide 2 formed on the substrate, and a control electrode (30, 31) provided on the substrate and controlling the light wave propagating through the optical waveguide. The control electrode is made of a material other than gold, and the gold is disposed on at least a wire bonding portion 4 of the control electrode. FIG. 2 is a cross-sectional view taken along one-dot chain line A-A' in FIG. 1. Arrows a and b in FIG. 1 represent a light wave (a) that is input to the optical waveguide element and a light wave (b) that is output from the optical waveguide element.

As the substrate having the electro-optic effect used in the present invention, various substrates known in the related art such as lithium niobate can be used.

The optical waveguide 2 can be easily formed by locally increasing a refractive index by thermal diffusion of Ti or the like. In addition, if necessary, it is possible to form a ridge on the substrate 1 to enhance a light confinement effect.

The control electrode used in the present invention is made of a material other than gold (Au), and the material preferably has an electric resistivity of $2.44 \times 10^{-8}$ Ωm or less. Specifically, silver (Ag) disclosed in Patent Literature No. 1 or copper (Cu) and copper alloys (Al—Cu alloy, Ni—Cu alloy, Be—Cu alloy, Sn—Cu alloy, or the like) disclosed in Patent Literature No. 2 can be used. Particularly, copper or copper alloy is preferable from the viewpoint of manufacturing cost.

A height H of the control electrode is preferably 10 μm or higher in consideration of impedance for propagating a high-frequency signal. In addition, depending on a depth of oxidation from the surface of the electrode, it is preferable that the height and width have thickness of at least 5 μm or higher in consideration of conversion to an insulator due to oxidation.

A feature of the present invention is that, in order to easily and surely perform wire bonding for electrical connection using metal wires such as a gold wire or a gold ribbon or the like on the surface of the control electrode, gold (Au) or platinum (Pt) is disposed on the surface of the control electrode at the location where the wire bonding is performed. Considering the bonding stability with the gold wire, gold (Au) is more preferable.

In addition, in order to suppress the propagation loss of the high-frequency signal, it is necessary to make a state of a resistance value of the electrode surface (a distribution state of the electric resistance) uniform in the signal electrode and the ground electrode located in an action portion of the control electrode. Therefore, at least the gold (Au) is not disposed on a surface of a signal electrode 30 of the action portion. The gold (Au) is not disposed on a surface, on a side facing the signal electrode, of the ground electrode 31. In addition, as shown in FIG. 2, it can be said that it is preferable not to dispose the gold (Au) on the side of an upper surface of the ground electrode 31 closer to the signal electrode in order to suppress the propagation loss of the high-frequency signal.

As shown in FIG. 2, a ratio of the height h of the gold portion to the height H of the control electrode is preferably less than 10%. Accordingly, it is possible to suppress an influence of the gold film 4 portion that contributes to the propagation of the high-frequency signal. That is, it is possible to reduce the influence of the conductor loss due to gold. In addition, it is effective to make the thickness of the gold film thinner than the depth of the skin effect in which a high-frequency signal is exhibited. For example, it is preferably 2 μm or lower, more preferably 1 μm or lower.

Figure 3:
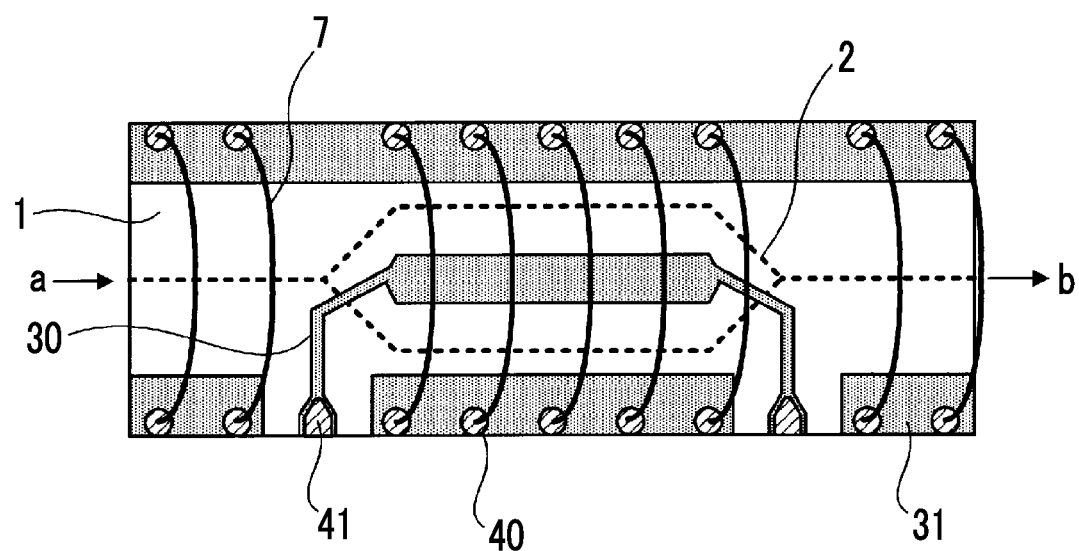
FIG. 3 is a plan view showing a second example of the optical waveguide element of the present invention.

As shown in FIG. 3, the portion where the gold (40, 41) is disposed can be only the wire bonding portion. Reference numeral 7 is a wire-bonded metal wire. By adopting such a configuration, the gold (40, 41) also serves as a mark at the time of wire bonding, and the yield due to defect is improved. The usage of the gold (Au) is also minimized, and the conductor loss due to the existence of gold is also suppressed. With respect to the disposition of the gold 40 on the control electrode, the gold can be formed in a dome shape such as a bump of an electronic circuit substrate. The gold 41 is a gold film corresponding to a pad portion of the signal electrode.

Figure 4:
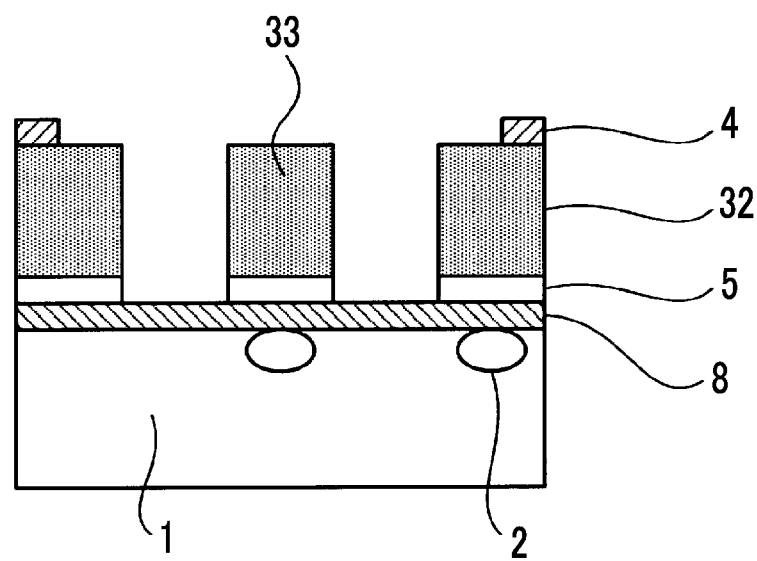
FIG. 4 is a cross-sectional view when the optical waveguide element of the present invention is applied to a Z-cut type substrate.

Although the X-cut type substrate 1 has been described with reference to FIG. 2, the present invention is not limited to this, and is similarly applicable to the Z-cut type substrate 1 as shown in FIG. 4. Reference numeral 33 indicates a signal electrode and reference numeral 32 indicates a ground electrode. Reference numeral 8 is a buffer layer ($SiO_2$ or the like) for suppressing absorption of the light wave propagating through the optical waveguide by the control electrode.

A base layer 5 under the control electrode in FIG. 2 or FIG. 4 is a base electrode for securely fixing the control electrode on the substrate 1 or the buffer layer 8, and for example, titanium (Ti) or the like can be used. As disclosed in Patent Literature No. 2, it is possible to use the base layer 5 as a protective layer to suppress the occurrence of electromigration, which occurs when copper ions move from a copper electrode. The protective layer can be configured with metal nitride (SiN, CrN, TiN or CuN) or Si or a mixture thereof.

INDUSTRIAL APPLICABILITY

As described above, according to the present invention, it is possible to provide an optical waveguide element capable of connection such as wire bonding, suppressing usage of gold, and suppressing deterioration of the conductor loss.

We claim:

1. An optical waveguide element comprising:
a substrate having an electro-optic effect;
an optical waveguide formed on the substrate; and a control electrode provided on the substrate which controls a light wave propagating through the optical waveguide and which includes a signal electrode and a ground electrode, wherein the control electrode is made of a material other than gold, gold is disposed on at least a wire bonding portion of the control electrode, and at least in an action portion where an electric field of the control electrode acts on the optical waveguide, the gold is not disposed on a surface of the signal electrode, a side surface of the ground electrode facing the signal electrode and a side of an upper surface of the ground electrode closer to the signal electrode.

2. The optical waveguide element according to claim 1, wherein the signal electrode is disposed between the ground electrodes which are connected to each other by a wire.

3. The optical waveguide element according to claim 1, wherein a portion on which the gold is disposed is only the wire bonding portion.

4. The optical waveguide element according to claim 1, wherein the material other than gold has an electric resistivity of $2.44 \times 10^{-8}$ $\Omega$m or less.

5. The optical waveguide element according to claim 1, wherein the control electrode is a plating electrode and a height of the plating electrode is 10 μm or higher.

6. The optical waveguide element according to claim 1, wherein a ratio of a height of the gold portion to a height of the control electrode is less than 10%.

* * * * *